Feb. 9, 1954 W. R. ISOM 2,668,476
ADJUSTABLE LENS UNIT MOUNT
Filed May 28, 1952

INVENTOR.
Warren R. Isom
BY
ATTORNEY.

Patented Feb. 9, 1954

2,668,476

UNITED STATES PATENT OFFICE 2,668,476

ADJUSTABLE LENS UNIT MOUNT

Warren R. Isom, West Collingswood, N. J., assignor to Radio Corporation of America, a corporation of Delaware Application May 28, 1952, Serial No. 290,443

6 Claims. (Cl. 88—57)

This invention relates to adjustable portions of film cameras or projectors, and particularly to an adjusting mechanism or mount for the optical barrel of a film projector lens unit.

It is well-known that lens mounts for motion picture projectors may be adjusted longitudinally to focus the image on the film at different distances from the projector. These mounts, in the past, have generally used a spring-held ball or a thumb operated screw for holding the lens mount in a fixed position when once adjusted. Since the lens mount cylinder casing is usually of comparatively soft metal, the threads on the casing are frequently damaged by the spring-pressed ball or thumb screw. Furthermore, a spring-pressed ball arrangement always has a certain amount of back-lash.

The present invention is directed to an adjustable holding mount which permits ready adjustment of the lens unit longitudinally in its housing and permits it to be tightly held in any adjusted position without damage whatsoever to the threaded portion of the unit. It also provides internal threads to a smooth bore. To accomplish this result, a small rod of the desired length has a series of grooves machined around it, the grooves having the same center distance as the pitch of the threads of the unit. The rod is made a loose captive in a cylindrical cavity which is parallel to and which intersects the bore of the mount. A screw or pin maintains the rod in longitudinal position, while a fixed thumb or finger screw bears against the bottom of a rod groove perpendicularly to the axis of the rod instead of against the bottom of the thread of the unit. In this manner, the pressure is distributed over a plurality of threads to prevent the threads of the unit being damaged.

The principal object of the invention, therefore, is to facilitate the adjusting and holding of an optical lens barrel or unit in its housing.

Another object of the invention is to provide an improved adjusting and locking mechanism for a lens barrel mount.

A further object of the invention is to provide an elongated pressure unit for holding a threaded lens unit in position.

A still further object of the invention is to provide a means of internally threading a smooth bore.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
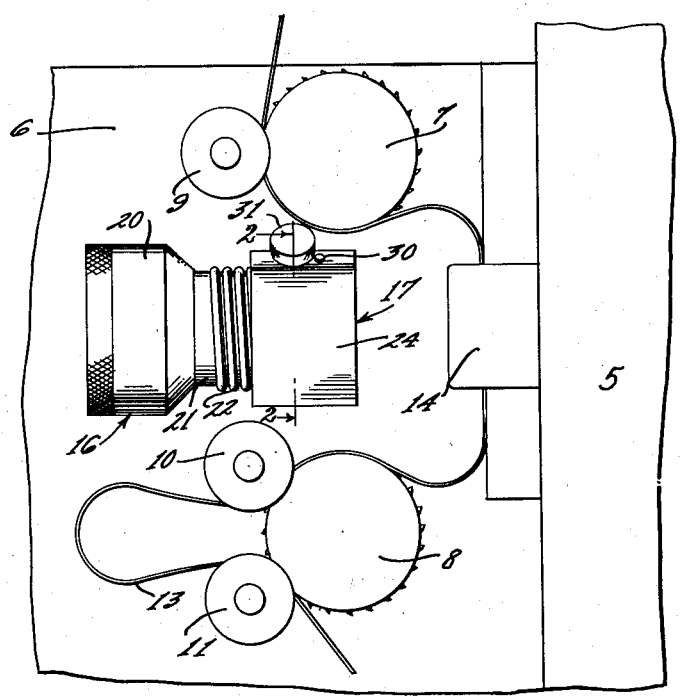
Fig. 1 is a side elevational view of a portion of a film projector embodying the invention.
Figure 2:
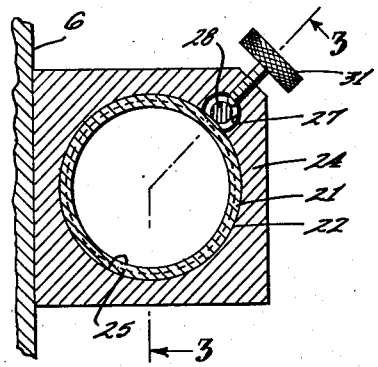
Fig. 2 is a cross-sectional view of the lens unit mount taken along the line 2—2 of Fig. 1.

Referring now to the drawings, in which the same numerals identify like elements, a projector 5 has a mounting plate 6, on which are sprockets 7 and 8 having pad rollers 9, 10, and 11 for advancing a film 13 through the projector. An intermittent mechanism 14 intermittently advances the film past the projection aperture, the image on the film being projected by the optical unit 16 held in a housing mount 17.

Figure 3:
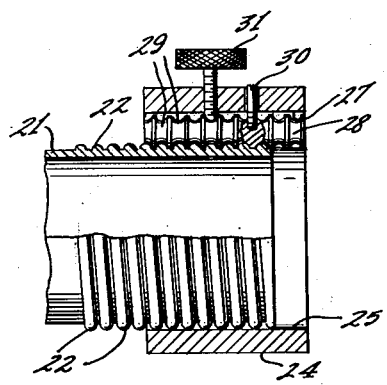
Fig. 3 is a cross-sectional view of the lens unit mount taken along the line 3—3 of Fig. 2.

The optical unit 16 is composed of the large diameter section 20 and a cylindrically threaded barrel portion 21 having a thread 22 thereon. The mount consists of a housing 24 attached to panel 6 and having a smooth surfaced bore 25, in which is positioned the threaded portion 22 of the unit 16. In addition to the bore 25, a second cylindrical cavity 27 is drilled in the housing 24 and in which is loosely positioned a rod 28 having parallel grooves 29, the center distance between grooves corresponding with the pitch of the thread 22. The rod 28 is held in a fixed longitudinal position by a set screw 30 screwed in rod 28, the screw 30 being loose in a hole in the wall of the housing so that the rod may move perpendicularly to its axis. (See Fig. 3.) A pin pressed into a hole in the rod may be substituted for the set screw 30.

To tightly hold the unit 16 in fixed position, a thumb screw 31 is threaded through the wall of the casting 24. The end of the screw 31 bears against the bottom of one groove and exerts pressure between all grooves and the thread 22. Therefore, even though the pressure of screw 31 is sufficient to damage a groove of the rod 28, no damage is done to the thread 22. When it is desired to adjust the unit 16, the screw 31 is backed off, and the unit is free to be rotated to longitudinally position the unit 16, the grooves 29 providing the internal coacting thread in the bore 25 for the thread 22. The grooved rod 28 may be of a soft material, such as Bakelite, so as not to injure the thread 22, or it may be made of hardened steel to provide a positive engagement with the thread.

The type of lens mount above described is lash-free and permits the lens unit to be quickly adjusted and then firmly held in position without damage thereto.

I claim:

1. An adjustable lens unit mount comprising a housing having a longitudinal bore therein, a lens unit adapted to be moved longitudinally in said bore by threads on a cylindrical portion thereof, said housing having a second cylindrical bore therein parallel to said first bore and longitudinally intersecting said first mentioned bore, a rod having a series of circumferential grooves having the same pitch as said threads in said second bore, said rod being movable perpendicularly to its axis in said bore, means for preventing longitudinal movement of said rod, and means for applying pressure to said rod to provide a locking force between said rod and said unit by contact between said grooves and a plurality of said threads.

2. An adjustable lens unit mount in accordance with claim 1, in which said first mentioned means is a fixed set screw loosely positioned in a hole in the wall of said housing and fixedly connected to said rod, and said last mentioned means is a thumb screw adapted to be moved into and out of contact with one of said grooves.

3. An adjustable lens unit mount comprising a lens barrel having threads thereon, a housing having a smooth bore therein in which said barrel is adapted to be moved longitudinally, said housing having a second smaller bore therein parallel with said first bore and intersecting said first mentioned bore along a small segment of its circumference, a cylindrical rod in said smaller bore movable perpendicularly to its axis in said smaller bore, and screw means for applying a force perpendicular to the axis of said rod to urge said rod in contact with said barrel over its entire length and over a plurality of threads of said lens barrel.

4. An adjustable lens unit mount in accordance with claim 3, in which said rod has parallel grooves around its circumference, the center distance between said grooves being the same as the pitch of said barrel threads, and means are provided to prevent longitudinal movement of said rod in said smaller bore and permit movement of said rod perpendicularly to its axis.

5. An adjustable lens unit mount in accordance with claim 3, in which said rod has parallel grooves around its circumference, said screw means containing the bottom of one of said grooves.

6. An adjustable lens unit mount in accordance with claim 4, in which said last mentioned means is a pin loosely positioned in a hole in said housing, the axis of said hole being perpendicular to the axis of said rod, said pin being fixedly attached to said rod.

WARREN R. ISOM.

References Cited in the file of this patent

UNITED STATES PATENTS

| Number | Name | Date |
|---|---|---|
| 1,649,646 | Badgley | Nov. 15, 1927 |
| 1,780,945 | Sapier | Nov. 11, 1930 |
| 1,848,253 | Howell | Mar. 8, 1932 |
| 1,879,737 | Del Riccio | Sept. 27, 1932 |
| 2,373,052 | Rausch | Apr. 3, 1945 |
| 2,493,463 | Morgan et al. | Jan. 3, 1950 |